Jan. 26, 1960 H. A. HOWELL 2,922,859
ELECTRIC CHOPPER
Filed Aug. 26, 1957
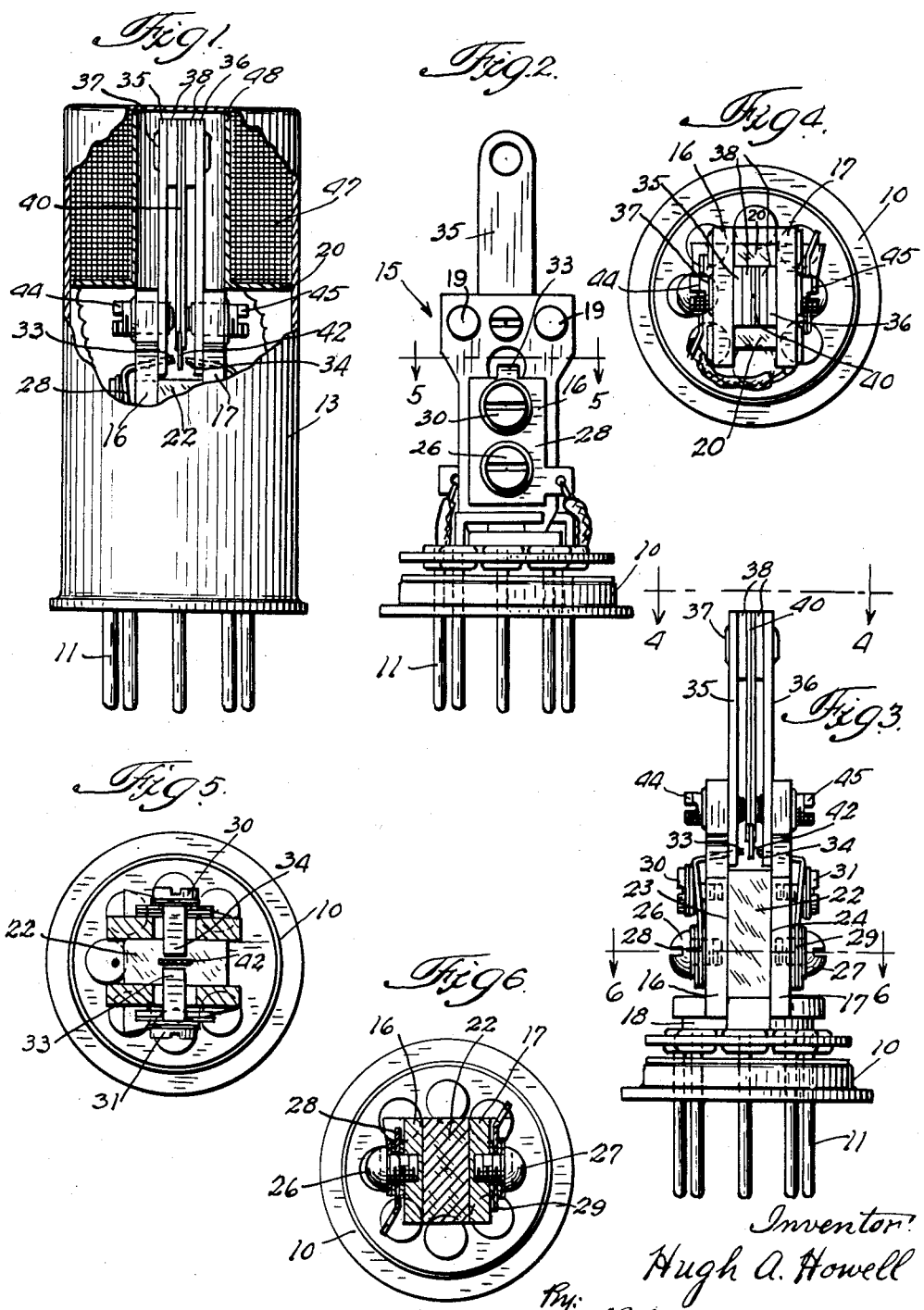
Inventor:
Hugh A. Howell
by Robert L. Kahn Atty.

United States Patent Office 2,922,859
Patented Jan. 26, 1960

2,922,859

ELECTRIC CHOPPER

Hugh A. Howell, Berwyn, Ill., assignor to Oak Mfg. Co., Cook County, Ill., a corporation of Illinois Application August 26, 1957, Serial No. 680,316

2 Claims. (Cl. 200—90)

This invention relates to an electric chopper and more particularly to a chopper of compact construction for a wide variety of uses. The invention will best be understood by referring to the drawings wherein an exemplary embodiment is illustrated. In the drawing, Figure 1 is an elevation with certain parts broken away of a chopper embodying the present invention, the chopper being in a can.

Figure 2 is a front elevation of the chopper of Figure 1 without the can.

Figure 3 is a side elevation of the chopper illustrated in Figure 2.

Figure 4 is a top view along line 4—4 of Figure 3.

Figure 5 is a section along line 5—5 of Figure 2.

Figure 6 is a section along line 6—6 of Figure 3.

The chopper is mounted on base 10 carrying a plurality of contact prongs 11 so that the same may be plugged into a suitable socket.

The entire chopper is adapted to be enclosed in a cylindrical can 13 of metal or other suitable material. The chopper generally indicated by 15 comprises side members 16 and 17 of ferro-magnetic material, such as soft iron, rigidly attached to non-magnetic base member 18. Side members 16 and 17 have their top ends rigidly supported by rivets 19 and non-magnetic spacers 20. Disposed between side members 16 and 17 is permanent magnet 22 preferably of an oriented ceramic oxide material now available on the market. Such permanent magnets have high coercive forces of the order of 1,000 oersteds and the desirable property of being usable in flat thin slabs with opposed pole faces 23 and 24 across the smallest dimension. Conventional permanent magnets are difficult to magnetize across a small dimension. Permanent magnet alloys of platinum and cobalt have high coercive forces and may be used. The ratio of magnet length (distance between pole faces) to thickness (distance across pole face) may be as low as ⅓ or ¼. The permanent magnet must also have sufficient lines of force to be satisfactory.

Each of the side members are tapped to accommodate support bolts 26 and 27. Insulatingly supported on the bolts are thin contact plates 28 and 29 of spring metal. Each of these contact plates is provided with a suitable lug for connecting to a circuit.

Above each of the support bolts 26 and 27 are contact adjusting screws 30 and 31. These are disposed in tapped apertures in frame members 16 and 17 and serve to limit the outward spring of contact plates 28 and 29. It is understood that the contact plates are electrically insulated from both screws.

Each of the contact plates 28 and 29 terminates at its upper portion in stationary contact fingers 33 and 34. These extend through apertures in side members 16 and 17. The contact plates are of a spring metal which preferably will not corrode. Thus the contact plates may be made of thin platinum. It is also possible to make the contact plates of stainless steel, preferably non-magnetic, and have contact tips 33 and 34 of suitable material such as platinum or silver or any other material which makes a suitable contact material. As a rule such choppers carry little current and do not require refractory tungsten contacts.

Carried by the top ends of the ferro-magnetic side members 16 and 17 are non-magnetic support plates 35 and 36. These plates may be of brass as an example and are riveted together at 37. Disposed between support plates 35 and 36 are a number of spacers 38 and laminated magnetic reed 40. Magnetic reed 40 preferably consists of two thin layers of soft spring steel. Reed 40 extends towards the permanent magnet and at its free end carries movable contact 42 rigidly locked between the two layers of reed metal. Thus contact 42 may be of platinum and in practice will be very thin so that the two layers of reed material can be spread slightly to accommodate contact 42. The two layers of reed and the contact may be soldered or brazed together. As is illustrated in the drawing, movable contact member 42 extends beyond the bottom end of the laminated reed and is disposed between fixed contacts 33 and 34.

The magnetic circuit between the side members and the reed may be controlled by a pair of ferro-magnetic adjusting screws 44 and 45 disposed in tapped apertures in side members 16 and 17 on opposite sides of the reed. These screws are of soft iron and may be adjusted so that the flat ends will have a predetermined distance between them. Normally the reed will be midway between the pole pieces formed by the screw ends.

An actuating winding 47 is disposed within can 13, said windings preferably being on a non-magnetic spool 48. The winding is disposed adjacent the closed end of the can and normally will surround the reed.

It is understood that winding 47 is energized by alternating current at a desired frequency for chopper operation. By proper adjustment of faces 22 and 23, screws 44 and 45 and proper selection of the reed in regard to resonance, desirable chopper operation at a desired frequency and amplitude will result.

By virtue of the compact ceramic magnet, the entire chopper construction is rendered rugged and may be readily adjusted for suitable operation.

The new construction may also be used as a relay.

What is claimed is:

1. A chopper comprising a pair of elongated ferromagnetic side members, means disposing said side members in opposed relation at a predetermined distance from each other, said side members having one end thereof defining the bottom of the chopper and having the other end thereof extending toward the top of the chopper, a ceramic type permanent magnet disposed between the lower portion of said side members, said permanent magnet having pole faces opposite the side members with the pole faces being across the shortest dimension of the permanent magnet, spring stationary contact members supported by said side members, said stationary contact members including contact fingers extending toward each other in a region between the side members, a reed extending lengthwise of the chopper, said reed having a free end disposed between the top ends of the side members and having a clamped end extending lengthwise of the chopper away from the side members, means supported by the side members for supporting the bound end of said reed, ferro-magnetic means for adjusting the air gap at the movable end of the reed and an actuating winding disposed around the portion of said reed extending beyond the frame members.

2. The chopper according to claim 1 wherein said magnet has a ratio of magnet length to thickness of no more than about one-third, the magnet length being measured between opposing pole faces.

References Cited in the file of this patent

UNITED STATES PATENTS

| | | |
|---|---|---|
| 2,101,665 | Arey et al. | Dec. 7, 1937 |
| 2,102,409 | Faus | Dec. 14, 1937 |
| 2,486,394 | Eannarino | Nov. 1, 1949 |
| 2,489,372 | Garstang | Nov. 29, 1949 |
| 2,594,088 | Sonnemann et al. | Apr. 22, 1952 |
| 2,678,360 | Bellis | May 11, 1954 |
| 2,698,366 | Howell | Dec. 28, 1954 |
| 2,718,570 | Caldwell | Sept. 20, 1955 |
| 2,761,929 | McLellan et al. | Sept. 4, 1956 |
| 2,848,579 | Russell | Aug. 19, 1958 |